(12) United States Patent
Lucht et al.

(10) Patent No.: US 7,943,063 B2
(45) Date of Patent: *May 17, 2011

(54) THERMOCHROMIC INDICATOR MATERIALS WITH CONTROLLED REVERSIBILITY

(75) Inventors: Brett Lucht, Wakefield, RI (US); William B. Euler, Narragansett, RI (US); Yu Wang, Worcester, MA (US)

(73) Assignee: The Board of Governors for Higher Education, State of Rhode Island and Providence Plantations, Providence, RI (US)

( * ) Notice: Subject to any disclaimer, the term of this patent is extended or adjusted under 35 U.S.C. 154(b) by 34 days.

This patent is subject to a terminal disclaimer.

(21) Appl. No.: 12/405,027

(22) Filed: Mar. 16, 2009

(65) Prior Publication Data
US 2009/0302277 A1 Dec. 10, 2009

Related U.S. Application Data

(63) Continuation of application No. 11/024,326, filed on Dec. 28, 2004, now Pat. No. 7,517,475, and a continuation of application No. PCT/US03/20537, filed on Jun. 30, 2003.

(60) Provisional application No. 60/392,452, filed on Jun. 28, 2002.

(51) Int. Cl.
*G01N 31/00* (2006.01)
*G01N 33/00* (2006.01)

(52) U.S. Cl. .................................................. 252/408.1
(58) Field of Classification Search ................ 252/408.1
See application file for complete search history.

(56) References Cited

U.S. PATENT DOCUMENTS

| | | | | |
|---|---|---|---|---|
| 4,339,951 A * | 7/1982 | Yee et al. | ....................... | 374/162 |
| 4,732,810 A * | 3/1988 | Kito et al. | .................. | 428/402.2 |
| 5,826,915 A * | 10/1998 | Gregory, Jr. | .................... | 283/67 |
| 6,706,812 B2 * | 3/2004 | Chrobaczek et al. | ......... | 524/838 |
| 7,517,475 B2 * | 4/2009 | Lucht et al. | ................ | 252/408.1 |

* cited by examiner

*Primary Examiner* — Jennifer K Michener
*Assistant Examiner* — Eli S Mekhlin
(74) *Attorney, Agent, or Firm* — Perkins Coie LLP; Michael Wise

(57) ABSTRACT

A thermal indicator material which comprises a plurality of polythiophenes having a second low temperature color and a high temperature color. The polythiophenes are structured and arranged to exhibit a color change from the second low temperature color to the high temperature color when the thermal indicator material is exposed to a temperature that meets or exceeds a pre-determined temperature and to exhibit a color change from the high temperature color to a first low temperature color when the thermal indicator material is exposed to a decline in temperature from a temperature that meets or exceeds the predetermined temperature to a temperature of within the range of between about 5 to 20° C. below the pre-determined temperature that occurs in a time period of greater than 2.0 seconds.

17 Claims, 7 Drawing Sheets

THERMOCHROMIC INDICATOR MATERIALS WITH CONTROLLED REVERSIBILITY

CROSS-REFERENCE TO RELATED APPLICATIONS

This application is a continuation application of U.S. patent application Ser. No. 11/024,326, filed Dec. 28, 2004 now U.S. Pat. No. 7,517,475, and claims the benefit of U.S. Provisional Application Ser. No. 60/392,452, filed on Jun. 28, 2002, and International Patent Application. Serial No. PCT/US2003/020537 filed Jun. 30, 2003, all applications of which are hereby incorporated by reference in their entireties. U.S. patent application Ser. No. 11/024,326, filed Dec. 28, 2004 is related to International Patent Application Serial No. PCT/US02/22079, filed Jan. 10, 2002 and U.S. patent application Ser. No. 09/758,075, filed Jan. 10, 2001 now U.S. Pat. No. 6,706,218, both applications of which are hereby incorporated by reference in their entireties.

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of FY01-PS10 awarded by USDOT.

FIELD OF THE INVENTION

The invention relates to thermochromic indicator materials comprised of polythiophenes.

DESCRIPTION OF RELEVANT ART

Polythiophenes are known for their electrically conductive properties. One technique used to study polythiophenes is to analyze associated color changes when the temperature of the polythiophene is varied. Color changes provide insight into the electro-conductive properties of the polymer. There are numerous patent and literature citations which describe this work.

In many instances it is clearly desirable to know when an object or article reaches or has exceeded a specific temperature simply by viewing the object and noting that at least a portion of the object has exhibited a color change. Viewing includes visual observation by an individual or detection of color change by a sensor, which sensor would output a signal to be detected in any suitable manner.

For example, the useful life of many products can become comprised if exposed to temperatures above a pre-determined temperature. Accordingly, a need exists for a thermal indicator that exhibits a controlled color change indicative of when such products, e.g., food and protective fire suits, have been exposed to the pre-determined temperature. The present invention addresses this need.

BRIEF SUMMARY OF THE INVENTION

Broadly, the invention comprises a thermal indicator material comprised of temperature sensitive polymers that exhibit a visually detectable color change at a proscribed temperature within the range of between about −30 to 150° C. The visual detection can include visual observation by an individual or detection of the exhibited color change by a sensor, which sensor would output a signal to be detected in any suitable manner. The temperature of the color change (hereinafter referred to as the thermochromic transition) can be adjusted by synthetically modifying the thermochromic polymers. Upon heating a sample of the thermal indicator material to a high temperature within the range of between about 130° C. and 160° C., preferably 140° C., followed by rapid cooling, the sample will maintain a new color at low temperatures within the range of between about 0° C. and 30° C., preferably 20° C. When the sample is reheated above the thermochromic transition and allowed to cool slowly, the sample reverts to the original low temperature color. This controlled reversible thermochromic transition results from the heating of the sample to a high temperature followed by the rapid cooling of the sample. The temperature sensitive polymers, when used as pigments to mark an item, can indicate whether the marked item has met or exceeded a pre-determined temperature at any time after marking. Items coated with the polymers show no detectable loss of the mark after more than one year of storage below the thermochromic transition temperature. The thermochromic polymers can be dispersed in commercial plastics (polyurethane, polystyrene, polyethylene, etc.) at low concentrations and retain the controlled reversibility. The temperature sensitive polymers can also be used as a pigment for inks.

The thermochromic polymers are generally of the structure:

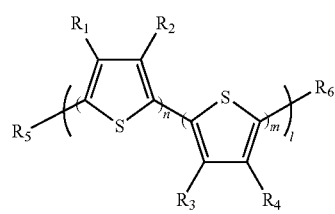

I wherein $R_1$-$R_6$=a hydrogen, substituted or unsubstituted alkyl radical, substituted or unsubstituted alkoxy radical, substituted or unsubstituted aryl radical, substituted or unsubstituted thioalkyl radical, substituted or unsubstituted trialkylsilyl radical, substituted or unsubstituted acyl radical, substituted or unsubstituted ester radical, substituted or unsubstituted amine radical, substituted or unsubstituted amide radical, substituted or unsubstituted heteroaryl or substituted or unsubstituted aryl radical n is between 1 and 1000, m is between 0 and 1000, and l is between 1 and 1000.

Compound I has reversible color changes upon temperature variation. The temperature of the color change and the reversibility is dependent upon the structure of the polymer or the oligomer. The mechanism for the thermochromic transition is based on a two-step process. At low temperature the polymer has the conjugated repeat units (responsible for color) in a planar conformation and the substituents of the polythiophene chain are ordered into a lattice. As the temperature is raised, the side chain lattice melts and the resulting disorder allows the main chain repeat units to twist away from planarity as shown below in Scheme 1:

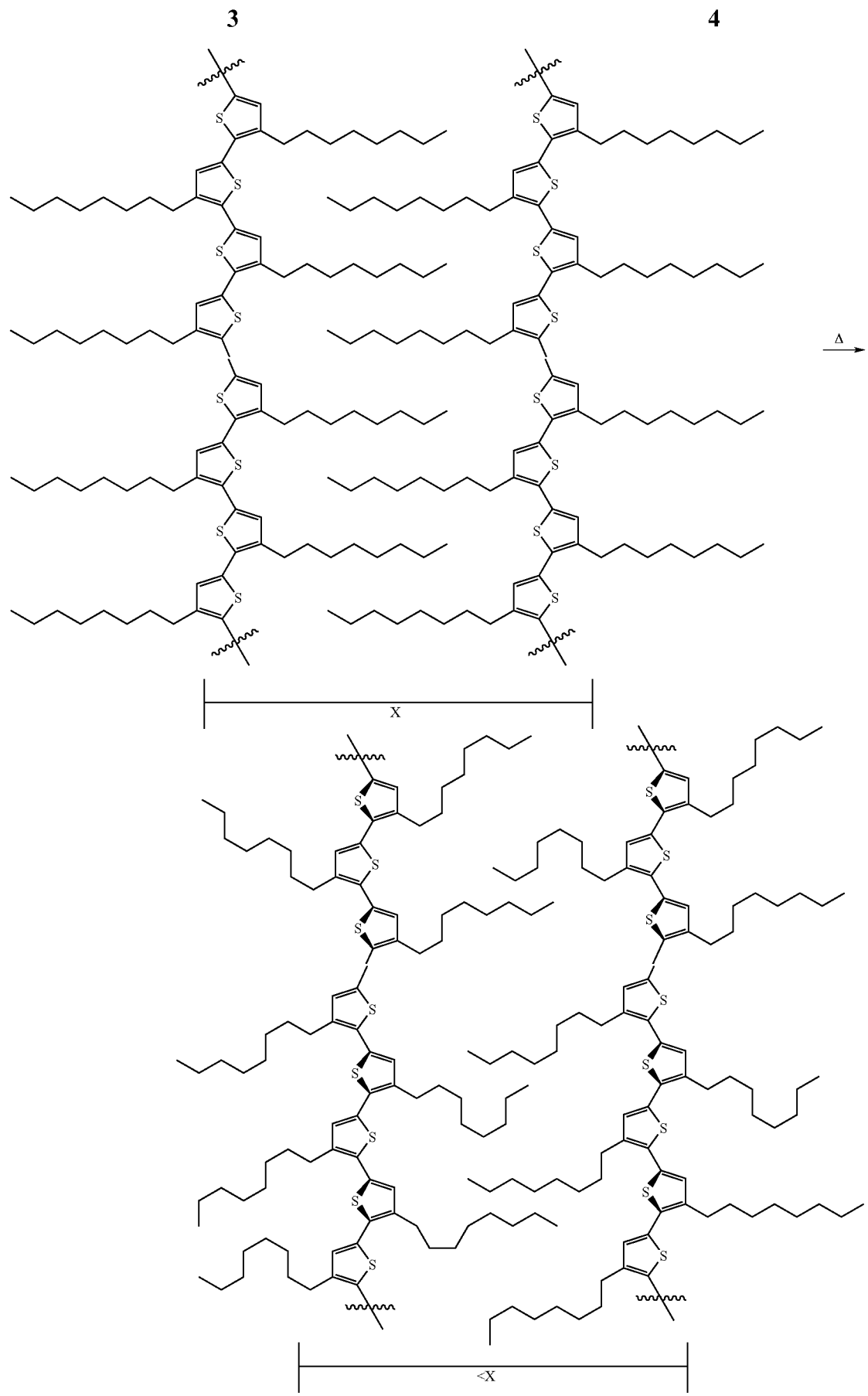

The twisting of the polythiophene units increases the band gap which results in a blue shift of the optical absorption as shown in Scheme 2:

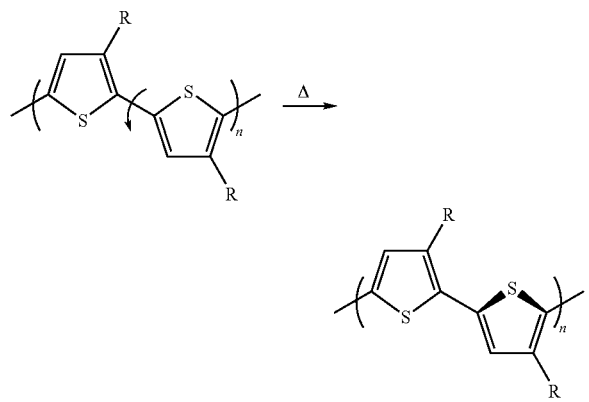

Polythiophenes with long sidechains are believed to have sharp thermochromic transitions due to the two-phase morphology. The melting of the sidechains causes a zipper effect, which results in a sharp thermochromic transition. When polythiophenes with long sidechains films are rapidly cooled the side chain lattice freezes before the main chain twists back to a planar conformation. Since the main-chain is locked in a staggered conformation the color of the material has a shorter wavelength absorption than polythiophenes that are cooled slowly allowing the main-chain thiophene units to become planar.

In one aspect, the invention comprises a method for producing a thermal indicator material which comprises a plurality of compounds having the following structure:

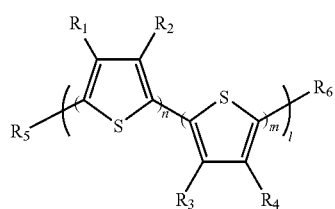

wherein $R_1$-$R_6$ is a hydrogen, substituted or unsubstituted alkyl radical, substituted or unsubstituted alkoxy radical, substituted or unsubstituted aryl radical, substituted or unsubstituted thioalkyl radical, substituted or unsubstituted trialkylsilyl radical, substituted or unsubstituted acyl radical, substituted or unsubstituted ester radical, substituted or unsubstituted amine radical, substituted or unsubstituted amide radical, substituted or unsubstituted heteroaryl or substituted or unsubstituted aryl radical, n is between 1 and 1000, m is between 0 and 1000, and l is between 1 and 1000. The compounds have a first low temperature color and are structured to exhibit a high temperature color when the compound is exposed to temperatures above a pre-determined temperature. The compounds are heated to a temperature within the range of between about 130° C. and 160° C., preferably 140° C. to form heated compounds. The heated compounds are cooled within a time period of less than 2.0 seconds, preferably 0.1 seconds, to a temperature within the range of between about 0° C. and 30° C., preferably 20° C., to form cooled compounds. The cooled compounds exhibit a second low temperature color and exhibit a color change from the second low temperature color to the high temperature color when the thermal indicator material is exposed to a temperature that meets or exceeds the pre-determined temperature and exhibit a color change from the high temperature color to the first low temperature color when the thermal indicator material is exposed to a decline in temperature from a temperature that meets or exceeds the pre-determined temperature to a temperature within the range of about 5 to 20° C. below the pre-determined temperature, the decline in temperature occurring in a time period of greater than 2.0 seconds, preferably 20 seconds. The compounds can be heated for a time period within the range of between about 5 seconds to 1000 seconds, preferably 40 seconds. The pre-determined temperature range of the compounds can be in the range of between about −30 to 150° C., preferably 65 to 100° C.

In another aspect of the invention, the method further comprises admixing the cooled compounds with a carrier medium. The cooled compounds can be present in the thermal indicator material in an amount of about 0.05 to about 25.0%, preferably 5.0% by weight based on the total weight of the thermal indicator material.

In yet another aspect of the invention, the pre-determined temperature can be 85° C., the first low temperature color is burgundy, the high temperature color is yellow and the second low temperature color is orange.

In another aspect of the invention, $R_1$ and $R_4$ are $C_{20}$-$C_{50}$ alkyls or substituted alkyls, and $R_2$, $R_3$, $R_5$ and $R_6$ are H, n is 0.8, m is 0.2, and l is between 15 and 100.

In yet another aspect of the invention, the carrier medium comprises an ink formulation.

In yet another aspect, the thermal indicator material produced by the method will exhibit a color change from the high temperature color to the second low temperature color when the thermal indicator material is exposed to a decline in temperature from a temperature that meets or exceeds the pre-determined temperature to a temperature within the range of between about 20 to 50° C. below the pre-determined temperature that occurs in a time period of less than 2 seconds.

The invention also comprises the thermal indicator materials produced by the method as well as the thermal indicator materials admixed with a carrier material.

As used herein, the terms low temperature color means the color the polythiophenes will exhibit below the pre-determined temperature and when the color change has either been completed or commenced. The term high temperature color means the color the polythiophenes will exhibit above the pre-determined temperature and when the color change has been either completed or commenced.

BRIEF DESCRIPTION OF THE DRAWING(S)

DESCRIPTION OF THE PREFERRED EMBODIMENT(S)

Referring to FIG. 1, a photograph depicting polythiophene films on paper at: (a) room temperature; (b) above the thermochromic temperature; (c) thermally marked with Sargent key; and (d) thermally marked with a circle is shown. The films are comprised of a polythiophene wherein $R_1$ and $R_4$ are —$(CH_2)_{21}CH_3$, $R_2$, $R_3$, $R_5$ and $R_6$ are H, n is 0.8, m is 0.2, and l is between 25 and 50. The films in FIG. 1 were spin coated from THF solutions of the polythiophene onto paper. After spin coating, the films were heated with a heat gun to between 120 and 150° C. and then were allowed to slowly cool (>2 seconds) to room temperature to remove any residual solvent. This provided the burgundy film shown in FIG. 1a. Heating the film a second time to between 120 and 150° C. causes the film to change in color from burgundy to yellow as shown in FIG. 1b. After heating films to between 120 and 150° C. the films can be rapidly cooled (0.1 seconds) by pressing a metal key onto the surface of the film. Rapid cooling to low temperature, 0 to 30° C., allows the generation of an orange mark in the form of a key. The remainder of the film, which cooled slowly, returns to the original low temperature color, burgundy (FIG. 1c). If the film is maintained at temperatures below the thermochromic transition of the polythiophene film (85° C.) the mark will be retained for more than a year. However, if the film is heated above 85° C. the mark will disappear. After heating films to between 120 and 150° C. the films can be rapidly cooled by pressing metal fuse onto the film. Rapid cooling to low temperature, 0 to 30° C., allows the generation of an orange mark in the form of a circle (FIG. 1d).

Figure 1A:
FIG. 1 depicts polythiophene films of the invention on paper at: (a) room temperature; (b) above the thermochromic temperature; (c) thermally marked with Sargent key; and (d) thermally marked with a circle.
Figure 1B:
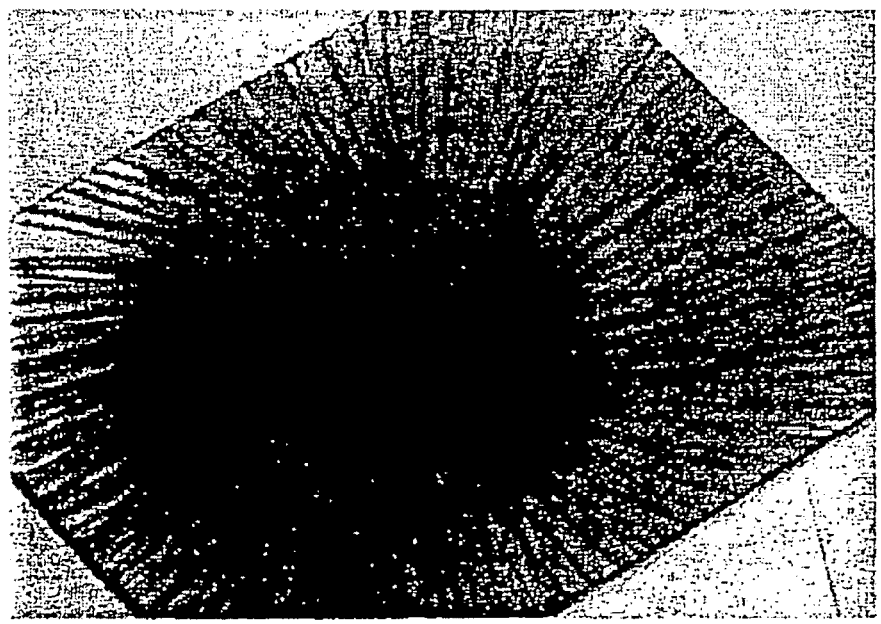
Figure 1C:
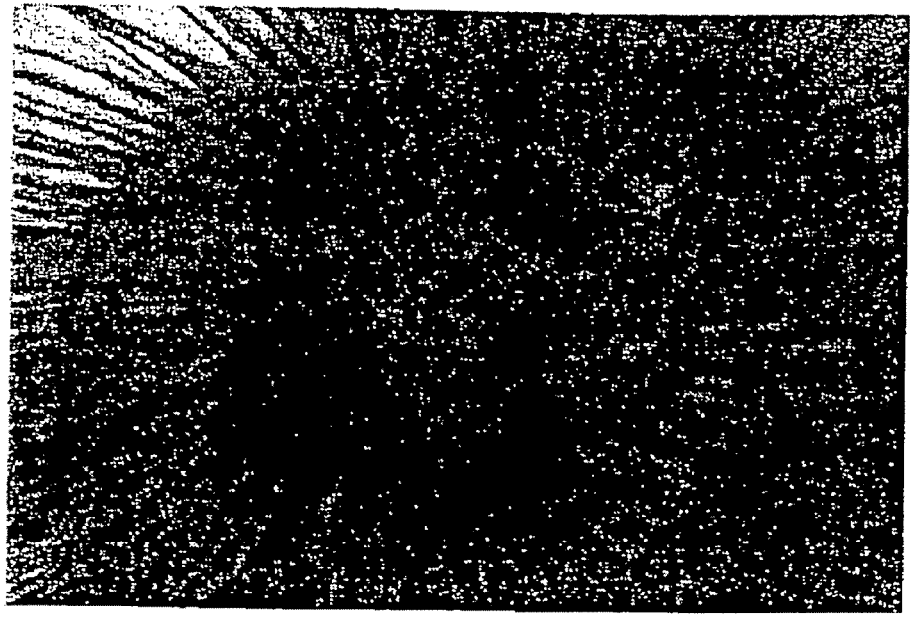
Figure 1D:
Figure 2:
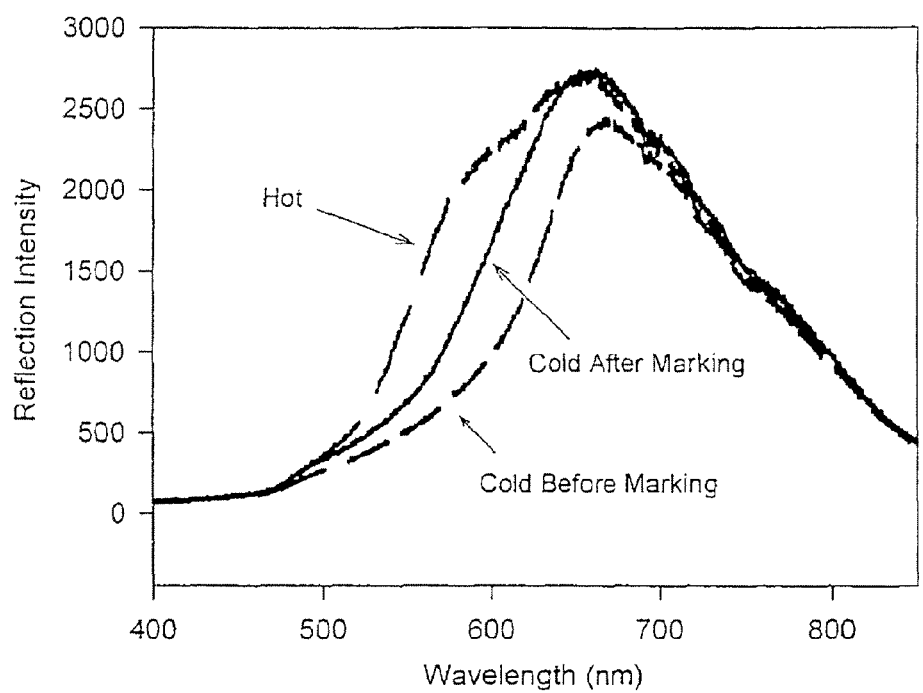
FIG. 2 is a graph depicting the reflectance spectra of thermochromic indicator materials of the invention below the thermochromic transition before marking, above the thermochromic transition, and below the thermochromic transition after marking.

Referring to FIG. 2, a graph depicting the reflectance spectra of thermochromic indicator materials of the invention below the thermochromic transition before marking, above the thermochromic transition, and below the thermochromic transition after marking. The films are comprised of a polythiophene wherein $R_1$ and $R_4$ are —$(CH_2)_{21}CH_3$, $R_2$, $R_3$, $R_5$ and $R_6$ are H, n is 0.8, m is 0.2, and l is between 25 and 50.

Figure 3:
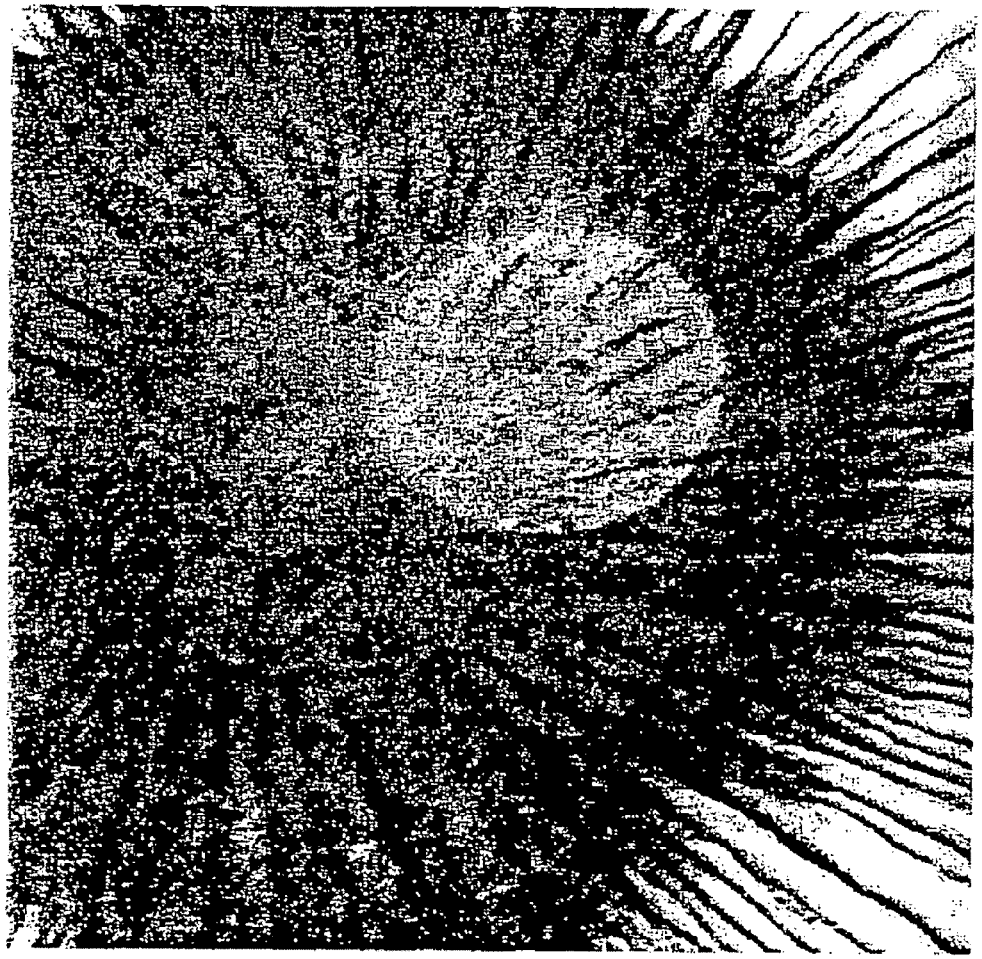
FIG. 3 depicts polythiophene films of the invention on paper thermally marked with a circle.

Referring to FIG. 3, a photograph depicting polythiophene films on paper thermally marked with a circle. The films are comprised of a polythiophene wherein $R_1$ and $R_4$ are —$(CH_2)_{19}CH_3$, $R_2$, $R_3$, $R_5$ and $R_6$ are H, n is 0.8, m is 0.2, and l is between 25 and 50. The films in FIG. 3 were spin coated from THF solutions of the polythiophene onto paper. After spin coating, the films were heated with a heat gun to between 120 and 150° C. and then were allowed to slowly cool (>2 seconds) to room temperature to remove any residual solvent. The low temperature films are red. After heating films to between 120 and 150° C. the films can be rapidly cooled (0.1 second) by pressing a metal fuse onto the surface of the film. Rapid cooling to low temperature, 0 to 30° C., allows the generation of an orange mark in the form of a circle. The remainder of the film, which cooled slowly, returns to the original low temperature color, red (FIG. 3). If the film is maintained at temperatures below the thermochromic transition of the polythiophene film (75° C.) the mark will be retained for more than a year.

Figure 4:
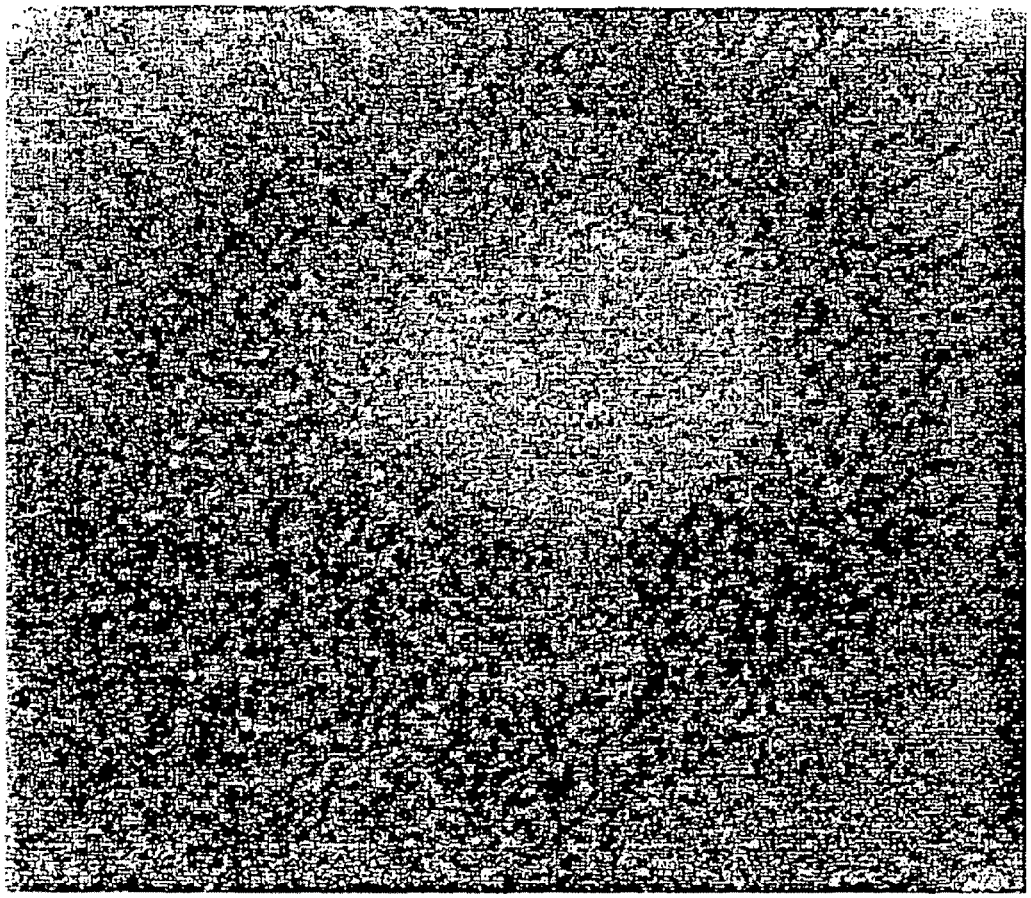
FIG. 4 depicts polythiophene films of the invention on paper thermally marked with a circle.

Referring to FIG. 4, a photograph depicting polythiophene films on paper thermally marked with a circle. The films are comprised of a polythiophene wherein $R_1$ and $R_4$ are —$(CH_2)_{21}CH_3$, $R_2$, $R_3$, $R_5$ and $R_6$ are H, n is >0.95, m is <0.05, and l is between 25 and 50. The films in FIG. 4 were spin coated from THF solutions of the polythiophene onto paper. After spin coating, the films were heated with a heat gun to between 120 and 150° C. and then were allowed to slowly cool (>2 seconds) to room temperature to remove any residual solvent. The low temperature films are purple. After heating films to between 120 and 150° C. the films can be rapidly cooled (0.1 seconds) by pressing a metal fuse onto the surface of the film. Rapid cooling to low temperature, 0 to 30° C., allows the generation of an red mark in the form of a circle. The remainder of the film, which cooled over more than 2 seconds, returns to the original low temperature color, purple (FIG. 4). If the film is maintained at temperatures below the thermochromic transition of the polythiophene film (95° C.) the mark will be retained for more than a year.

The synthesis of compound(s) I is known in the art. In the synthesis of compound(s) I to exhibit the color change at the pre-determined temperature, e.g., for the series of poly(3-alkylthiophene)s, there is roughly an inverse correlation with the length of the n-alkane substituent and the temperature of the thermochromic transition for both the regiorandom ($R_1$=alkyl, $R_4$=alkyl, n≈0.8, m≈0.2, l=40-80, $R_2$, $R_3$, $R_5$, $R_6$=H) and regioregular ($R_1$=alkyl, n=40-80, m=0, $R_2$, $R_5$, $R_6$=H), poly(3-n-alkylthiophene)s. For regiorandom polymers longer substituents such as n-hexadecyl have lower temperature thermochromic transitions (81° C.) than shorter chain substituents such as n-octyl (130° C.). The regioregular polymers have higher thermochromic transitions than the regiorandom polymers but the same inverse correlation with chainlength is observed. The n-hexadecyl and n-octyl have thermochromic transition centered around 125 and 175° C. The thermochromic transition temperatures are dependent upon the molecular weight of the polymer. Lower molecular weight polymers have lower thermochromic transition temperatures while higher molecular weight polymers have higher thermochromic transition temperatures.

In one embodiment, the invention includes the use of compound I as pure compounds or admixed with paints including polyurethanes, polysiloxanes, polyacrylates, and other related polymer-based paints and coatings with about 0.5% polymer based pigment with retention of the thermochromic behavior. The thermochromic polymer-based pigments can be incorporated via injection molding or extrusion into many commercially important plastics such as poly(ethylene terephthalate) (PET), polysytrene, polyethylene (HDPE and LDPE), other polyolefins, polydienes, polycarbonates, polyacrylics, polyacrylic acids, polyacrylamides, polymethacrylics, polyvinyl ethers, polyvinyl halides, poly(vinyl nitrile)s poly vinyl esters, polyesters, polysulfones, polysulfonamides, polyamides, polyimines, polyimides, carbohydrates, and polymer mixtures and copolymers. The plastics retain a visually retrievable thermochromic response with pigment loadings of about 0.5% polymer-based pigment.

In yet another embodiment of the invention, polythiophenes exhibiting controlled thermochromic transitions are dispersed in commercially available printable ink formulations, e.g. oil with resins, pigment extenders and other additives, to form thermal indicator ink systems. The polythiophenes are present in the thermal indicator ink in an amount of 1.0-25% by weight based on the total weight of the thermal indicator ink, preferably 7.0 to 14% weight. The ink can be printed using conventional methods such as ink-jet and letter press. Examples of ink formulations that polythiophene can be dispersed in can include combinations of resins such as cellulose, nitrocellulose with co-binders including polyamides, polyester amides, alkyd, epoxy acrylates, amine acrylates, polyurethanes, and polyvinyl butyral (UNI-REZ, UNI-JET, BECKOSOL, EPOTUF), suitable oils such as napthenic petroleum oils and vegetable oils, e.g. soy bean oil, and suitable pigment extenders and additives that can include organic acids and esters of organic acids such as malic acid and organic solvents such as 1,5-pentanediol, diethylene glycol, along with other alcohols and related compounds (VERTEC, SYLFAT, UNI-KYD, and ICM, DY-SOLVE lines of additives.).

In yet another embodiment the invention, the thermal indicator ink is printed on at least a portion of a suitable substrate, e.g. a portion of paper, plastic, or ceramic food/beverage containers, a portion of packaging materials for foods and goods, labels, a portion of labels, stickers, etc., using conventional printing methods. The polythiophenes dispersed in the ink system can be in particulate form and have diameters in the range of between about 0.01-0.1 microns thereby rendering the system suitable for fine printing.

In another embodiment of the invention, the thermal indicator material is applied to an article, e.g., a portion of paper, plastic or ceramic food/beverage containers, as a coating on an area of the article, or the entire article, which will be visible during the expected use of the article. The coating can be applied by any technique known in the art, such as by brush, roller, spraying, etc. Accordingly, the coatings typically have a thickness of 0.1 to 1000 microns. The thermal indicator material can also be absorbed on a surface or both absorbed and adsorbed on a surface.

Suitable carrier mediums to be admixed with the polythiophenes exhibiting controlled reversible thermochromic transitions can include polyurethanes; elastomers including polysiloxanes and polydienes; polyacrylates, poly(ethylene terephthalate)s (PET), polysytrenes, polyolefins including polyethylenes (HDPE and LDPE) and polypropylene, polycarbonates, polyacrylics, polyacrylic acids, polyacrylamides, polymethacrylics, polyvinyl ethers, polyvinyl halides, poly(vinyl nitrile)s polyvinyl esters, polyesters, polysofones, polysulfonamides, polyamides, polyimines, polyimides, and carbohydrates.

The invention will further be described with reference to following non-limiting examples.

Example I

The thermal indicator material comprising the polythiophenes exhibiting controlled thermochromic transitions can be prepared via a two step process. Thin films or powders of polythiophenes can be heated above the thermochromic transition, typically 120-150° C., with a heat gun, oven, or hot plate. The samples are typically heated over a short period of time (5-20 seconds), but slower heating rates are appropriate also, e.g., greater than at least 20 seconds, preferably 20 to 1000 seconds. The heated films or powders are then rapidly removed from the heat, e.g., within a time period of about 0 to 10 seconds, preferably less than 2 seconds and cooled via contact with a thermally conductive material such as a metal plate. The metal plate can be at room temperature or below room temperature as long as it is at least 20° C. below the thermochromic transition temperature. The contact with the low temperature thermally conductive surface rapidly cools the polythiophenes from at or above the thermochromic transition to within 5 to 20° below the thermochromic transition within a time period less than 2 seconds, preferably 0.1 seconds, resulting in the production of the second low temperature colored material.

The polythiophene films in FIG. 1 have a thermochromic transition of 85° C. The films in FIG. 1 were spin coated from THF solutions of the polythiophene onto paper. After spin coating, the films were heated with a heat gun to between 120 and 150° C. and then were allowed to slowly cool (>2 seconds) to room temperature to remove any residual solvent. This provided the burgundy film shown in FIG. 1a. Heating the film a second time to between 120 and 150° C. for 5 seconds causes the film to change in color from burgundy to yellow as shown in FIG. 1b. After heating films to between 120 and 150° C. the films can be rapidly cooled by pressing a metal key onto the surface of the film. Cooling to low temperature, 0 to 30° C. in 0.1 seconds, allows the generation of an orange mark in the form of a key. The remainder of the film, which cooled slowly, returns to the original low temperature color, burgundy (FIG. 1c). If the film is maintained at temperatures below the thermochromic transition of the polythiophene film (85° C.) the mark will be retained for more than a year. However, if the film is heated above 85° C. the mark will disappear. After heating films to between 120 and 150° C. the films can be rapidly cooled by pressing metal fuse onto the film. Rapid cooling to low temperature, 0 to 30° C., allows the generation of an orange mark in the form of a circle.

The polythiophene films in FIG. 3 have a thermochromic transition of 75° C. The films in FIG. 3 were spin coated from THF solutions of the polythiophene onto paper. After spin coating, the films were heated with a heat gun to between 120 and 150° C. and then were allowed to slowly cool (>2 seconds) to room temperature to remove any residual solvent. The low temperature films are red. After heating films to between 120 and 150° C. for 5 seconds the films can be rapidly cooled by pressing a metal fuse onto the surface of the film. Cooling to low temperature, 0 to 30° C., in 0.1 seconds allows the generation of an orange mark in the form of a circle. The remainder of the film, which cooled slowly, returns to the original low temperature color, red (See FIG. 3). If the film is maintained at temperatures below the thermochromic transition of the polythiophene film (75° C.) the mark will be retained for more than a year.

The polythiophene films in FIG. 4 have a thermochromic transition of 95° C. The films in FIG. 4 were spin coated from THF solutions of the polythiophene onto paper. After spin coating, the films were heated with a heat gun to between 120 and 150° C. and then were allowed to slowly cool to room temperature to remove any residual solvent. The low temperature films are purple. After heating films to between 120 and 150° C. for 5 seconds the films can be rapidly cooled by pressing a metal fuse onto the surface of the film. Cooling to low temperature, 0 to 30° C., in 0.1 seconds allows the generation of a red mark in the form of a circle. The remainder of the film, which cooled slowly, returns to the original low temperature color, purple (See FIG. 4). If the film is maintained at temperatures below the thermochromic transition of the polythiophene film (95° C.) the mark will be retained for more than a year.

The foregoing description has been limited to a specific embodiment of the invention. It will be apparent, however, that variations and modifications can be made to the invention, with the attainment of some or all of the advantages of the invention. Therefore, it is the object of the appended claims to cover all such variations and modifications as come within the true spirit and scope of the invention.

The invention claimed is:
1. A method for producing a thermal indicator material comprising:
   providing a plurality of compounds having the following structure:

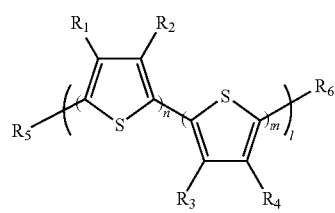

I wherein:
   $R_1$-$R_6$=a hydrogen, substituted or unsubstituted alkyl radical, substituted or unsubstituted alkoxy radical, substituted or unsubstituted thioalkyl radical, substituted or unsubstituted trialkylsilyl radical, substituted or unsubstituted acyl radical, substituted or unsubstituted ester radical, substituted or unsubstituted amine radical, substituted or unsubstituted amide radical, substituted or unsubstituted heteroaryl or substituted or unsubstituted aryl radical;

n is between 1 and 1000;
m is between 0 and 1000;
l is between 1 and 1000; and the compounds having a first low temperature color;

heating the compounds to a temperature of or above a pre-determined temperature to form heated compounds;

cooling the heated compounds to a temperature within a range of between about 20° C. and 50° C. below the pre-determined temperature in a time period of less than 2.0 seconds to form cooled compounds, the cooled compounds exhibiting a second low temperature color and exhibiting a color change from the second low temperature color to the first low temperature color when the compounds are exposed to a temperature that meets or exceeds the pre-determined temperature and then cooled to a temperature within the range of between about 5 to 20° C. below the pre-determined temperature in a time period of greater than 2.0 seconds.

2. The method of claim 1 wherein the heating step comprises heating the compound for a time period within the range of between about 5.0 seconds to 1000 seconds.

3. The method of claim 1 which further comprises admixing the cooled compounds with a carrier medium.

4. The method of claim 3 wherein the cooled compounds are present in the thermal indicator material in an amount of about 0.05 to about 25.0% by weight based on the total weight of the thermal indicator material.

5. The method of claim 3 wherein the carrier medium is selected from the group consisting of polyurethanes; elastomers including polysiloxanes and polydienes; polyacrylates, poly(ethylene terephthalate)s (PET), polysytrenes, polyolefins including polyethylenes (HDPE and LDPE) and polypropylene, polycarbonates, polyacrylics, polyacrylic acids, polyacrylamides, polymethacrylics, polyvinyl ethers, polyvinyl halides, poly(vinyl nitrile)s polyvinyl esters, polyesters, polysulfones, polysulfonamides, polyamides, polyimines, polyimides, and carbohydrates.

6. The method of claim 3 wherein the carrier medium is an ink formulation.

7. The method of claim 3 wherein the ink formulation comprises oils, resins, pigment extenders and additives.

8. The method of claim 1 wherein the pre-determined temperature is in the range of between about −30 to 150° C.

9. The method of claim 8 wherein the pre-determined temperature is 85° C., the first low temperature color is burgundy, and the second low temperature is orange.

10. A thermal indicator material comprising:
a plurality of compounds having the following structure:

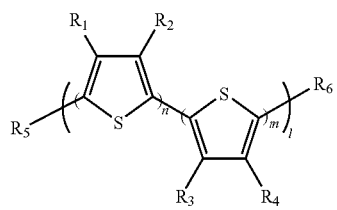

I wherein:

$R_1$-$R_6$=a hydrogen, substituted or unsubstituted alkyl radical, substituted or unsubstituted alkoxy radical, substituted or unsubstituted thioalkyl radical, substituted or unsubstituted trialkylsilyl radical, substituted or unsubstituted acyl radical, substituted or unsubstituted ester radical, substituted or unsubstituted amine radical, substituted or unsubstituted amide radical, or substituted or unsubstituted aryl radical;

n is between 1 and 1000;

m is between 0 and 1000;

l is between 1 and 1000;

the compounds having a first low temperature color and a second low temperature color; and the compounds are structured and arranged to exhibit a color change from the second low temperature color to the first low temperature color when the thermal indicator material is exposed to a temperature that meets or exceeds a pre-determined temperature and then cooled to a temperature of within the range of between about 5 to 20° C. below the pre-determined temperature in a time period of greater than 2.0 seconds.

11. The thermal indicator material of claim 10 which further comprises a carrier medium.

12. The thermal indicator material of claim 11 wherein the compounds are present in the thermal indicator material in an amount of about 0.05 to about 25.0% by weight based on the total weight of the thermal indicator material.

13. The thermal indicator material of claim 11 wherein the carrier medium is selected from the group consisting of polyurethanes; elastomers including polysiloxanes and polydienes; polyacrylates, poly(ethylene terephthalate)s (PET), polysytrenes, polyolefins including polyethylenes (HDPE and LDPE) and polypropylene, polycarbonates, polyacrylics, polyacrylic acids, polyacrylamides, polymethacrylics, polyvinyl ethers, polyvinyl halides, poly(vinyl nitrile)s polyvinyl esters, polyesters, polysulfones, polysulfonamides, polyamides, polyimines, polyimides, and carbohydrates.

14. The thermal indicator material of claim 11 wherein the carrier medium is an ink formulation.

15. The thermal indicator material of claim 11 wherein the ink formulation comprises oils, resins, pigment extenders and additives.

16. The thermal indicator material of claim 10 wherein the pre-determined temperature is in the range of between about −30 to 150° C.

17. The thermal indicator material of claim 10 wherein the pre-determined temperature is 85° C. and the first low temperature color is burgundy, and the second low temperature color is orange.

* * * * *